United States Patent

Schade et al.

[11] Patent Number: 5,773,545
[45] Date of Patent: Jun. 30, 1998

[54] POLYMERS OF ALKYL-1-VINYLIMIDAZLOES, THE PREPARATION AND USE THEREOF

[75] Inventors: Christian Schade, Ludwigshafen; Hans-Ulrich Jäger, Neustadt; Jürgen Detering, Limburgerhof, all of Germany

[73] Assignee: BASF Aktiengesellschaft, Ludwigshafen, Germany

[21] Appl. No.: 646,262

[22] PCT Filed: Nov. 23, 1994

[86] PCT No.: PCT/EP94/03868
§ 371 Date: May 20, 1996
§ 102(e) Date: May 20, 1996

[87] PCT Pub. No.: WO95/15345
PCT Pub. Date: Jun. 8, 1995

[30] Foreign Application Priority Data

Dec. 2, 1993 [DE] Germany ............ 43 41 072.3

[51] Int. Cl.⁶ .................. C08F 26/06; C08F 2/38
[52] U.S. Cl. ............ 526/262; 526/264; 526/260; 526/82; 526/222
[58] Field of Search ............... 526/262, 264, 526/260, 222, 82

[56] References Cited

U.S. PATENT DOCUMENTS 5,094,867  3/1992  Detering et al. .............. 426/271

FOREIGN PATENT DOCUMENTS 2814287  10/1979  Germany.

OTHER PUBLICATIONS

Abstract of L.
J. Inorg. Biochem. 17 (1982) 283–291.

*Primary Examiner*—James J. Seidleck
*Assistant Examiner*—Wu C. Cheng
*Attorney, Agent, or Firm*—Oblon, Spivak, McClelland, Maier & Neustadt, P.C.

[57] ABSTRACT

Polymers of alkyl-1-vinylimidazoles, a process for preparing polymers of alkyl-1-vinylimidazoles by free-radical polymerization of a monomer mixture comprising (a) 10–100% by weight of at least one alkyl-1-vinylimidazole and
(b) 0–90% by weight of 1-vinylpyrrolidone, 1-vinylcaprolactam, 1-vinyltriazole, 1-vinylimidazole, 1-vinyloxazolidinone or mixtures thereof,
(c) 0–30% by weight of other monoethylenically unsaturated monomers and
(d) 0–10% by weight of a monomer containing at least 2 monoethylenic double bonds in water, at least one $C_1$–$C_4$-alcohol or mixtures thereof, and the use of polymers which comprise at least 10% by weight of an alkyl-1-vinylimidazole as copolymerized unit as additive to detergents to inhibit transfer of dyes during the washing process.

10 Claims, No Drawings

5,773,545

POLYMERS OF ALKYL-1-VINYLIMIDAZLOES, THE PREPARATION AND USE THEREOF

The invention relates to polymers of alkyl-1-vinylimidazoles, to a process for preparing polymers of alkyl-1-vinylimidazoles by free-radical polymerization of a monomer mixture comprising (a) 10–100% by weight of at least one alkyl-1-vinylimidazole and (b) 0–90% by weight of 1-vinylpyrrolidone, 1-vinylcaprolactam, 1-vinyltriazole, 1-vinylimidazole, 1-vinyloxazolidinone or mixtures thereof, (c) 0–30% by weight of other monoethylenically unsaturated monomers and (d) 0–10% by weight of a monomer containing at least 2 monoethylenic double bonds in water, at least one $C_1$–$C_4$-alcohol or mixtures thereof, and to the use of polymers which comprise at least 10% by weight of alkyl-1-vinylimidazoles as copolymerized units as additive to detergents to inhibit transfer of dyes during the washing process.

DE-B-22 32 353 discloses detergent and cleaner mixtures which essentially consist of 95–60% by weight of nonionic detergents and 5–40% by weight of a partly or completely water-soluble polyvinylpyrrolidone and are essentially free of anionic surface-active agents. The polymers of vinylpyrrolidone prevent the transfer of dyes from colored to white textiles during the washing process. The polymers of vinylpyrrolidone have molecular weights in the range from about 10,000 to about 1,000,000. Both homopolymers and copolymers of vinylpyrrolidone are suitable. Suitable comonomers mentioned are acrylonitrile and maleic anhydride. The effectiveness of vinylpyrrolidone polymers as inhibitors of transfer of dyes is, however, greatly impaired by anionic surfactants. These polymers have only inadequate effectiveness for a number of dyeings.

DE-A-28 14 287 discloses detergents and cleaners which comprise anionic and/or nonionic surfactants, builders and other conventional detergent additives plus, as discoloration-inhibiting additives, 0.1–10% by weight of water-soluble or water-dispersible homo- or copolymers of N-vinylimidazole. The polymers have a specific viscosity of from 0.01 to 5 in a 1% by weight aqueous solution at 20° C. A serious disadvantage of these polymers is the fact that they are prone to produce very unpleasant odors in detergent formulations. There is reference to this also in EP-A-0 327 927. The polymers can also not always be incorporated into liquid detergents without problems because the resulting mixtures are unstable or cloudy.

J. Inorg. Biochem. 17 (1982) 283-291 discloses the synthesis of poly-2-methyl-1-vinylimidazole and of copolymers of 2-methyl-1-vinylimidazole and 1-vinylpyrrolidone in methanol.

It is an object of the present invention to provide novel substances and a process for preparing polymers of alkyl-1-vinylimidazoles which is easy to carry out industrially. Another object of the invention is to indicate substances which are suitable for use in detergents and which prevent color transfer during the washing process.

We have found that this object is achieved by polymers of alkyl-1-vinylimidazoles which are obtainable by free-radical polymerization of monomer mixtures comprising (a) 10–100% by weight of at least one alkyl-1-vinylimidazole, (b) 0–90% by weight of 1-vinylpyrrolidone, 1-vinylcaprolactam, 1-vinyltriazole, 1-vinylimidazole, 1-vinyloxazolidinone or mixtures thereof, (c) 0–30% by weight of other monoethylenically unsaturated monomers and (d) 0–10% by weight of a monomer containing at least 2 monoethylenic double bonds in water, at least one $C_{1-C4}$—alcohol or mixtures thereof, in the presence of polymerization regulators.

The object is also achieved according to the invention with a process for preparing polymers of alkyl-1-vinylimidazoles by free-radical polymerization of monomer mixtures comprising (a) 10–100% by weight of at least one alkyl-1-vinylimidazole and (b) 0–90% by weight of 1-vinylpyrrolidone, 1-vinylcaprolactam, 1-vinyltriazole, 1-vinylimidazole, 1-vinyloxazolidinone or mixtures thereof, (c) 0–30% by weight of other monoethylenically unsaturated monomers and (d) 0–10% by weight of a monomer containing at least 2 monoethylenic double bonds in water, at least one $C_{1-C4}$—alcohol or mixtures thereof, when the polymerization is carried out in the presence of polymerization regulators.

The last-mentioned object of the invention is achieved by using polymers which comprise at least 10% by weight of an alkyl-1-vinylimidazole as copolymerized units as additive to detergents to inhibit transfer of dyes during the washing process.

Suitable group (a) monomers are all 1-vinylimidazoles substituted by at least one alkyl group. They can be characterized, for example, by means of the following formula:

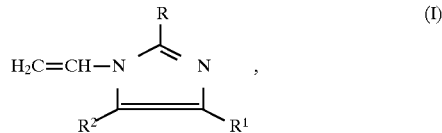

with R, $R^1$, $R^2$=H, $C_1$–$C_4$-alkyl, with at least one R, $R^1$ or $R^2$ substituent being a $C_1$–$C_4$-alkyl group. The $R^1$ and $R^2$ substituents are preferably H, $CH_3$ and $C_2H_5$.

Examples of group (a) monomers are 2-methyl-1-vinylimidazole, 2-ethyl-1-vinylimidazole, 2-propyl-1-vinylimidazole, 2-butyl-1-vinylimidazole, 2,4-dimethyl-1-vinylimidazole, 2,5-dimethyl-1-vinylimidazole, 2-ethyl-4-methyl-1-vinylimidazole, 2-ethyl-5-methyl-1-vinylimidazole, 2,4,5-trimethyl-1-vinylimidazole, 4,5-diethyl-2-methyl-1-vinylimidazole, 4-methyl-1-vinylimidazole, 4-ethyl-1-vinylimidazole, 4,5-dimethyl-1-vinylimidazole, 5-methyl-1-vinylimidazole or 2,4,5-triethyl-1-vinylimidazole. It is also possible to use mixtures of said monomers in any desired ratios. 2-Methyl-1-vinylimidazole, 2-ethyl-1-vinylimidazole, 2-ethyl-4-methyl-1-vinylimidazole or 4-methyl-1-vinyllimidazole is preferably used as group (a) monomer. 2-Methyl-1-vinylimidazole is very particularly preferred. The polymers comprise group (a) monomers in amounts of from 10 to 100% by weight as copolymerized units.

Group (b) monomers are 1-vinylpyrrolidone, 1-vinylcaprolactam, 1-vinyltriazole, 1-vinylimidazole and 1-vinyloxazolidinone and mixtures of said compounds with one another. Group (b) monomers which are preferably employed are 1-vinylpyrrolidone and/or 1-vinylimidazole. The group (b) monomers are, if they are used in the polymerization, present in amounts of up to 90% by weight in the monomer mixture.

Group (c) monomers are monoethylenically unsaturated compounds such as acrylamides, vinyl esters, vinyl ethers, (meth)acrylic esters, (meth)acrylic acid, maleic acid, maleic esters, styrene or 1-alkenes. The monomers which are preferably employed are diffrent from monomers (a) and (b) and contain a basic nitrogen atom. These monomers are employed either in the form of the free bases or in neutralized or quaternized form. Other preferred monomers are monomers comprising a basic nitrogen atom and an amide group in the molecule. Examples of said suitable and preferred monomers are N,N-dialkylaminoalkyl (meth) acrylates, eg. dimeth-ylaminoethyl acrylate, dimethylaminoethyl methacrylate, diethyl-aminoethyl acrylate, diethylaminoethyl methacrylate, dimethyl-aminopropyl acrylate, dimethylaminopropyl methacrylate, diethyl-aminopropyl acrylate and diethylaminopropyl methacrylate. Basic monomers which additionally comprise an amide group in the molecule are N,N' -dialkylaminoalkyl(meth) acrylamides, for example N,N' -di-$C_{1-C3}$-alkylamino-$C_{2-C6}$-alkyl(meth)acrylamides such as dimethylaminoethylacrylamide, dimethylaminoethylmethacrylamide, diethylaminoethylacrylamide, diethylaminoethylmethacrylamide, dimethylaminopropylacrylamide and dimethylaminopropylmethacrylamide. Other monomers which have a basic nitrogen atom are 4-vinylpyridine, 2-vinylpyridine, allyldi-$C_{1-C12}$-alkylamines and diallyl-$C_{1-C12}$-alkylamines. The basic monomers are used in the copolymerization in the form of the free bases, of the salts with organic or inorganic acids or in quaternized form. Suitable for the quaternization are, for example, alkyl halides with 1 to 18 carbon atoms in the alkyl group, for example methyl chloride, ethyl chloride or benzyl chloride. The nitrogen-containing basic monomers can also be quaternized by reaction with dialkyl sulfates, especially with diethyl sulfate or dimethyl sulfate. Examples of quaternized monomers are trimethylammonioethyl methacrylate chloride, dimethylethylammonioethyl methacrylate ethyl sulfate and dimethylethylammonioethylmethacrylamide ethyl sulfate. Also suitable are 1-vinylimidazolium compounds which are, for example, quaternized with $C_{1-C18}$-alkylhalides or benzyl chloride or converted into the salt form with an acid. Such monomers can be characterized, for example, by means of the general formula

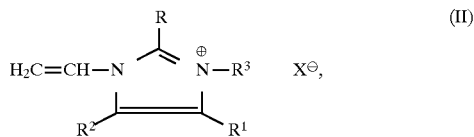

(II)

where

R, $R^1$ and $R^2$=H, $C_{1-C4}$-alkyl, $R^3$= H, $C_{1-C18}$-alkyl or benzyl and X⊖ is an anion.

The anion in formula II can be a halogen ion or else the radical of an inorganic or organic acid. Examples of quaternized 1-vinylimidazoles of the formula II are 3-methyl-1-vinylimidazolium chloride, 3-benzyl-1-vinylimidazolium chloride and 3-ethyl-1-vinylimidazolium sulfate. It is also, of course, possible for the polymers which comprise monomers (a) and, where appropriate, 1-vinylimidazole or basic monomers (c) to be partially quaternized by reaction with conventional quaternizing agents such as dimethyl sulfate or methyl chloride. Where monomers (c) are used, up to 30% by weight of them are present in the monomer mixture.

The polymerization of monomers (a) and, where appropriate, (b) and/or (c) can, where appropriate, also take place in the presence of group (d) monomers. These comprise monomers which contain at least 2 monoethylenic double bonds in the molecule. Compounds of this type are normally used in polymerization reactions as crosslinkers.

Examples of suitable crosslinkers of this type are diacrylates or dimethylacrylates of at least dihydric saturated alcohols, eg. ethylene glycol diacrylate, ethylene glycol dimethacrylate, 1,2-propylene glycol diacrylate, 1,2-propylene glycol dimethacrylate, 1,4-butanediol diacrylate, 1,4-butanediol dimethacrylate, hexanediol diacrylate, hexanediol dimethacrylate, neopentyl glycol diacrylate, neopentyl glycol dimethacrylate, 3-methylpentanediol diacrylate and 3-methylpentanediol dimethacrylate. The acrylic and methacrylic esters of alcohols with more than 2 OH groups can also be used as crosslinkers, eg. trimethylolpropane triacrylate or trimethylolpropane trimeth-acrylate. Another class of crosslinkers are diacrylates or dimethacrylates of polyethylene glycols or polypropylene glycols with molecular weights of, in each case, from 200 to 9000. Polyethylene glycols and polypropylene glycols used to prepare the diacrylates or dimethacrylates preferably have a molecular weight of, in each case, from 400 to 2000. Apart from the homopolymers of ethylene oxide and propylene oxide, it is also possible to employ block copolymers of ethylene oxide and propylene oxide or copolymers of ethylene oxide and propylene oxide which contain the ethylene oxide and propylene oxide units in random distribution. Oligomers of ethylene oxide or propylene oxide are also suitable for preparing the crosslinkers, eg. diethylene glycol diacrylate, diethylene glycol dimethacrylate, triethylene glycol diacrylate, triethylene glycol dimethacrylate, tetraethylene glycol diacrylate and/or tetraethylene glycol dimethacrylate. Also suitable as crosslinkers are vinyl esters of ethylenically unsaturated $C_{3-C6}$-carboxylic acids, eg. vinyl acrylate, vinyl methacrylate or vinyl itaconate. Also suitable as crosslinkers are vinyl esters of saturated carboxylic acids comprising at least 2 carboxyl groups, and di- and polyvinyl ethers of at least dihydric alcohols, eg. divinyl adipate, butanediol divinyl ether and trimethylolpropane trivinyl ether. Other crosslinkers are allyl esters of ethylenically unsaturated carboxylic acids, eg. allyl acrylate and allyl methacrylate, allyl ethers of polyhydric alcohols, eg. pentaerythritol triallyl ether, triallylsucrose and pentallylsucrose. Also suitable as crosslinkers are methylenebismethacrylamide, divinylethyleneurea, divinylpropyleneurea, divinylbenzene, divinyldioxane, tetraallylsilane and tetravinylsilane.

The group (d) monomers are employed in the copolymerization where appropriate. They can be present in the monomer mixtures in amounts of up to 10% by weight. If the group (d) monomers are copolymerized with monomers of group (a) and, where appropriate, groups (b) and/or (c), the amounts preferably used are from 0.05 to 8% by weight, based on the monomer mixtures.

The monomers are reacted in water, in at least one $C_{1-C4}$-alcohol, in mixtures of said alcohols or in mixtures of water and at least one alcohol. Water or mixtures of water and at least one $C_1$–$C_4$-alcohol in any desired ratio are preferably used as solvent. Suitable alcohols are methanol, ethanol, n-propanol, isopropanol, n-butanol, tert-butanol and isobutanol. The alcohols preferably employed are ethanol or isopropanol. It is also possible for inorganic salts, for example alkali metal halides or alkali metal sulfates, to be present in the polymerization in amounts of up to 20% by weight, based on the solvents employed. Monomers (a) and, where appropriate, (b) and/or (c) and, where appropriate, (d) are normally polymerized under an inert gas atmosphere with exposure to free-radical polymerization initiators. The polymerization of monomers of group (a) and, where appropriate, of group (b) and/or (c) results in low molecular weight polymers which are soluble in water or alcohol or mixtures thereof. If group (d) monomers are also used, the resulting copolymers are virtually insoluble in said solvents or swell in water, depending on the amount of crosslinker used. The concentration of the polymers in the resulting polymer solution is normally, for example, 5–60, preferably 20–45, % by weight.

The monomers undergo free-radical polymerization, ie. compounds which form free radicals under the polymerization conditions are necessary to initiate the homo- or copolymerization. Such freeradical initiators are all usual peroxy and azo compounds, for example peroxides, hydroperoxides and peroxy esters, such as hydrogen peroxide, dibenzoyl peroxide, di-tert-butyl peroxide, tert-butyl hydroperoxide, tert-butyl peroxypivalate and tertbutyl peroxy-2-ethylhexanoate, and azo compounds such as 2,2'-azobis(2-amidinopropane) dihydrochloride, 2,2'-azobis [2-(2-imidazolin-2-yl)propane] dihydrochloride, 4,4'-azobis(4-cyanovaleric acid), 2,2'-azobis(2,4-dimethylvaleronitrile), 2,2'-azobisisobutyronitrile, 2,2'-azobis(2-methylbutyronitrile) and dimethyl 2,2'-azobis(2-methylpropionate). It is, of course, also possible to use initiator mixtures or the known redox initiators. Examples of redox initiators are combinations of at least one peroxo compound such as potassium, sodium or ammonium persulfate, sodium hypochlorite, sodium perborate, sodium percarbonate, hydrogen peroxide, tert-butyl hydroperoxide or di-tert-butyl peroxide and at least one reducing agent such as ascorbic acid, lactic acid, citric acid, sodium sulfite, sodium bisulfite, acetone disulfite, sodium dithionite, sodium hydroxymethylsulfinate or a tertiary amine such as dimethylphenylamine. The initiators are employed in the usual amounts, eg. in amounts of from 0.1 to 6% by weight, based on the monomers to be polymerized.

The polymerization can take place in a wide temperature range, eg. at 50°–150° C. The temperature range of 50°–100° C. is preferred. If the polymerization takes place at temperatures above the boiling point of the solvent or solvent mixture, it is carried out at elevated pressures in apparatus which is closed pressure-tight. The polymerization is carried out according to the invention in the presence of polymerization regulators. Examples of suitable polymerization regulators are halogen compounds such as tetrachloro-methane, chloroform and bromotrichloromethane, allyl compounds such as allyl alcohol or 2,5-diphenyl-1-hexene, hydroxylamine and alkylhydroxylamines such as diethylhydroxylamine, salts of hydroxylamine and salts of alkylhydroxylamines, hypophosphites, formic acid, ammonium formate, aldehydes, hydrazine or salts of hydrazine such as hydrazine sulfate.

The polymerization regulators which are preferably used are ones containing sulfur in bound form. Examples of compounds of this type are inorganic bisulfites, sulfites such as sodium sulfite, disulfites and dithionites, or organic sulfides, disulfides, polysulfides, sulfoxides, sulfones and mercapto compounds. The following polymerization regulators are mentioned by way of example:

di-n-butyl sulfide, di-n-octyl sulfide, diphenyl sulfide, thiodiglycol, ethylthioethanol, diisopropyl disulfide, di-n-butyl disulfide, di-n-hexyl disulfide, diacetyl disulfide, di-t-butyl trisulfide and dimethyl sulfoxide. Compounds preferably employed as polymerization regulators are mercapto compounds, dialkyl sulfides, dialkyl disulfides and/or diaryl sulfides. Examples of these compounds are ethyl thioglycolate, diisopropyl disulfide, cysteine, 2-mercaptoethanol, 3-mercaptopropanol, 3-mercapto-1,2-propanediol, 4-mercaptobutanol, mercaptoacetic acid, 3-mercaptopropionic acid, mercaptosuccinic acid, thioglycerol, thioacetic acid, thiourea and alkyl mercaptans such as n-butyl mercaptan, n-hexyl mercaptan, n-dodecyl mercaptan or tert-dodecyl mercaptan. Polymerization regulators which are particularly preferably employed are mercapto alcohols and mercapto carboxylic acids. The polymerization regulators which contain sulfur in bound form are used in amounts of from 0.1 to 15, preferably 0.5 to 10, % by weight based on the monomers employed in the polymerization. It is, of course, also possible to use mixtures of polymerization regulators to be employed according to the invention in the polymerization.

The monomers can be polymerized by conventional process techniques, eg. by batch polymerization, in which either alkyl-1-vinylimidazoles or mixtures of alkyl-1-vinylimidazoles and, where appropriate, monomers (b) to (d), regulator and initiator are introduced into a solvent and heated to the polymerization temperature. The reaction mixture is stirred at the polymerization temperature until the conversion is preferably more than 99.5%. In this process it is also possible for the initiator to be added where appropriate only after the polymerization temperature has been reached.

Other variants of the polymerization process comprise conventional feed methods, which are preferably employed. In these variants of the process, for example, a solution of the polymerization regulator and an initiator solution are added continuously or in portions to a mixture of monomers (a) and, where appropriate, at least one monomer (b) to (d) and a solvent at the polymerization temperature within a certain time. However, it is also possible to meter a mixture of regulator and initiator into the initial mixture heated to the polymerization temperature. Another method comprises adding the initiator to the initial mixture below or at the polymerization temperature and adding only the regulator or a solution of the regulator, after the polymerization temperature has been reached, to the reaction mixture within a preset period. Another variant of the feed technique comprises heating the initial mixture to a temperature at which the polymerization takes place, and then adding regulator, initiator and monomers in separate feeds or together. In this technique, the initial mixture preferably comprises water or a mixture of water, monomer and/or initiator and/or regulator. A procedure which is preferred according to the invention is to add the polymerization regulators continuously or in portions during the polymerization of the monomers. Polymerization of monomers (a), where appropriate with monomers (b) and/or (c), by the process according to the invention results in low molecular weight polymers which have K values of 10–60 (determined by the method of H. Fikentscher in 0.1% strength aqueous solution at 25° C. with a polymer concentration of 1% by weight). If the polymerization of monomers (a) and, where appropriate, with at least one monomer (b) to (c) is carried out with monomers (d), the resulting polymers are insoluble in water and only swell in an aqueous medium. Because they do not dissolve in water, no K values can be determined for these copolymers.

The solutions resulting from the polymerization can be subjected after the polymerization process to a subsequent physical or chemical treatment. This means, for example, subsequent treatment of the polymer solution by steam distillation, stripping with steam and/or nitrogen or partial removal of the solvent by distillation, in which case volatile compounds or impurities are removed from the solution. In a subsequent chemical treatment, polymerization initiators or mixtures of several polymerization initiators are added, and the polymer solution is heated where appropriate at temperatures which are above the polymerization temperature. This reduces the residual monomer content in the polymers, for example.

It may also be advantageous in some cases to subject the polymers to subsequent oxidative treatment. For this purpose, the oxidizing agents are allowed to act, preferably as an aqueous solution, on the polymers. Examples of suitable oxidizing agents are hydrogen peroxide, alkyl hydroperoxides such as tert-butyl hydroperoxide, peracids, sodium hypochlorite, sodium perborate, sodium percarbonate or sodium persulfate. The use of hydrogen peroxide is particularly preferred. When a subsequent oxidative treatment is carried out, hydrogen peroxide or the other suitable oxidizing agents are used in amounts of 0.1–50% by weight based on the polymers. The treatment with oxidizing agents can take place, for example, at a temperature in the range 50°–120° C., normally using apparatus which is closed pressure-tight at temperatures above 100° C.

The process according to the invention results in polymer solutions which have a low residual monomer content or, when group (d) monomers are used, polymer suspensions with a low residual monomer content. The polymer solutions and the suspensions can be marketed directly. However, the polymers can also be isolated, eg. by spray drying from aqueous solution or dispersion.

Polymers which comprise at least 10% by weight of an alkyl-1-vinylimidazole as copolymerized units are used as additive to detergents to inhibit transfer of dyes during the washing process. When colored and white textiles are washed together they inhibit transfer of dye to the uncolored textiles. The amounts according to the invention of the polymers of alkyl-1-vinylimidazoles contained in the detergent formulations are such as effectively to prevent transfer of dyes during the washing process, eg. 0.1–10, preferably 0.2–4, % by weight of polymer, based on the particular detergent formulation. It is particularly preferred in this connection to use low molecular weight polymers of alkyl-1-vinylimidazoles obtainable by polymerization of the monomers in the presence of polymerization regulators, in particular those regulators which contain sulfur in bound form. The low molecular weight polymers of alkyl-1-vinylimidazoles which can be prepared by polymerization of monomers (a) and, where appropriate, (b) and/or (c) in the absence of monomers (d) have K values of from 10 to 60, preferably 12 to 40, determined by the method of H. Fikentscher in aqueous solution at 25° C. with a polymer concentration of 1% by weight.

The detergents can be in powder form or in a liquid formulation. The composition of the detergent and cleaner formulations may vary widely. Detergent and cleaner formulations normally comprise 2 to 50% by weight of surfactants and, where appropriate, builders. These data apply both to liquid and to powder detergents. Detergent and cleaner formulations customary in Europe, the USA and Japan are tabulated, for example, in Chemical and Engn. News, 67 (1989) 35. Further details of the composition of detergents and cleaners can be found in WO-A-90/13581 and Ullmanns Encyklopädie der technischen Chemie, Verlag Chemie, Weinheim 1983, 4th edition, pages 63–160. The detergents may also contain, where appropriate, a bleach, eg. sodium perborate, which can be present, when used, in amounts of up to 30% by weight in the detergent formulation. The detergents and cleaners may, where appropriate, contain other customary additives, eg. complexing agents, opacifying agents, optical brighteners, enzymes, perfume oils, other color transfer inhibitors, antiredeposition agents and/or bleach activators.

The low-molecular weight polymers of alkyl-1-vinylimidazoles or copolymers of monomers (a) and, where appropriate, (b) and/or (c) are particularly suitable for producing liquid detergent formulations because they are compatible with the constituents of the liquid detergent formulation, so that clear, storage-stable mixtures are obtained, from which the polymers do not separate out. The swellable polymers of alkyl-1-vinylimidazoles, which comprise, where appropriate, at least 1 monomer of component (b) and/or (c) and at least one monomer (d) as copolymerized units, are likewise used as additive to powder and liquid detergents. The crosslinked polymers are preferably employed in powder detergent formulations.

The residual content of alkyl-1-vinylimidazole monomers in the polymers prepared by the process according to the invention is normally not more than 0.2% by weight and can be reduced by suitable subsequent treatment of the polymers.

The K values stated in the examples are determined by the method of H. Fikentscher, Cellulose-Chemie, 13 (1932) 58–64 and 71–74 in aqueous solution at 25° C. with a polymer concentration of 1% by weight. The percentage data in the examples are percentages by weight, and the parts are parts by weight. The residual monomer content of the polymers was determined by gas chromatography.

EXAMPLE 1

150 g of water were introduced into a flask which had a capacity of 1000 ml and was equipped with a stirrer and a device for operating under nitrogen, and was heated to 80° C. under a nitrogen atmosphere. As soon as this temperature was reached, a feed consisting of 100 g of 2-methyl-1-vinylimidazole and 0.5 g of mercaptoethanol was added dropwise over the course of 2 hours, and another feed consisting of 1 g of 2,2'-azobis(2-amidinopropane) dihydrochloride in 50 g of water was added dropwise over the course of 4 hours. After the addition of the polymerization initiator was complete, the reaction mixture was stirred at 80° C. for a further 2 hours. The result was a clear viscous liquid with a solids content of 34.8% and a K value of 38.2.

EXAMPLE 2

150 g of water and 1 g of 2,2'-azobis(2-amidinopropane) dihydrochloride were introduced into a flask which had a capacity of 1000 ml and was equipped with a stirrer and a device for operating under nitrogen, and were heated to 80° C. under a nitrogen atmosphere. As soon as this temperature was reached, a feed consisting of 100 g of 2-methyl-1-vinylimidazole and 2 g of mercaptoethanol was added dropwise over the course of 2 hours, and another feed consisting of 1 g of 2,2'-azobis(2-amidinopropane) dihydrochloride in 50 g of water was added dropwise over the course of 4 hours. After the addition of the polymerization initiator was complete, the reaction mixture was stirred at 80° C. for a further 2 hours. The result was a clear viscous liquid with a solids content of 35.1% and a K value of 17.2.

EXAMPLE 3

150 g of water and 1 g of 2,2'-azobis(2-amidinopropane) dihydrochloride were introduced into a flask which had a capacity of 1000 ml and was equipped with a stirrer and a device for operating under nitrogen, and were heated to 80° C. under a nitrogen atmosphere. As soon as this temperature was reached, a feed consisting of 50 g of 2-methyl-1- vinylimidazole, 50 g of 1-vinylimidazole and 2 g of mercaptoethanol was added dropwise over the course of 2 hours, and another feed consisting of 1 g of 2,2'-azobis(2-amidinopropane) dihydrochloride in 50 g of water was added dropwise over the course of 4 hours. After the addition of the polymerization initiator was complete, the reaction mixture was stirred at 80° C. for a further 2 hours. The result was a clear viscous liquid with a solids content of 36.0% and a K value of 27.3.

EXAMPLE 4

150 g of water and 1 g of 2,2'-azobis(2-amidinopropane) dihydrochloride were introduced into a flask which had a capacity of 1000 ml and was equipped with a stirrer and a device for operating under nitrogen, and were heated to 80° C. under a nitrogen atmosphere. As soon as this temperature was reached, a feed consisting of 50 g of 2-methyl-1-vinylimidazole, 50 g of N-vinylpyrrolidone and 3 g of mercaptoethanol was added dropwise over the course of 2 hours, and another feed consisting of 1 g of 2,2'-azobis(2-amidinopropane) dihydrochloride in 50 g of water was added dropwise over the course of 4 hours. After the addition of the polymerization initiator was complete, the reaction mixture was stirred at 80° C. for a further 2 hours. The result was a clear viscous liquid with a solids content of 36.8% and a K value of 17.4.

EXAMPLE 5

150 g of water were introduced into a flask which had a capacity of 1000 ml and was equipped with a stirrer and a device for operating under nitrogen, and was heated to 80° C. under a nitrogen atmosphere. As soon as this temperature was reached, a feed consisting of 25 g of 2-methyl-1-vinylimidazole, 75 g of N-vinylpyrrolidone and 1 g of mercaptoethanol was added dropwise over the course of 2 hours, and another feed consisting of 1 g of 2,2'-azobis(2-amidinopropane) dihydrochloride in 50 g of water was added dropwise over the course of 2 hours and another feed consisting of 1 g of 2,2'-azobis(2-amidinopropane) dihydrochloride in 50 g of water was added dropwise over the course of 4 hours. After the addition of the polymerization initiator was complete, the reaction mixture was stirred at 80° C. for a further 2 hours. The result was a clear viscous liquid with a solids content of 34.7% and a K value of 26.2.

EXAMPLE 6

150 g of water were introduced into a flask which had a capacity of 1000 ml and was equipped with a stirrer and a device for operating under nitrogen, and was heated to 80° C. under a nitrogen atmosphere. As soon as this temperature was reached, a feed consisting of 75 g of 2-methyl-1-vinylimidazole, 25 g of N-vinylpyrrolidone and 1 g of mercaptoethanol was added dropwise over the course of 2 hours, and another feed consisting of 1 g of 2,2'-azobis(2-amidinopropane) dihydrochloride in 50 g of water was added dropwise over the course of 4 hours. After the addition of the polymerization initiator was complete, the reaction mixture was stirred at 80° C. for a further 2 hours. The result was a clear viscous liquid with a solids content of 35.0% and a K value of 23.6

EXAMPLE 7

150 g of ethanol were introduced into a flask which had a capacity of 1000 ml and was equipped with a stirrer and a device for operating under nitrogen, and were heated to 78° C. under a nitrogen atmosphere. As soon as this temperature was reached, a feed consisting of 100 g of 2-methyl-1-vinylimidazole and 0.5 g of mercaptoethanol was added dropwise over the course of 2 hours, and another feed consisting of 1 g of dimethyl 2,2'-azobisisobutyrate in 50 g of ethanol was added dropwise over the course of 3 hours. After the addition of the polymerization initiator was complete, the reaction mixture was stirred at 78° C. for a further 2 hours and then subjected to a steam distillation. The result was a clear viscous liquid with a solids content of 33.4% and a K value of 25.0.

EXAMPLE 8

100 g of water were introduced into a flask which had a capacity of 1000 ml and was equipped with a stirrer and a device for operating under nitrogen, and were heated to 50° C. under a nitrogen atmosphere. As soon as this temperature was reached, a feed consisting of 50 g of 2-methyl-1-vinylimidazole, 1 g of mercaptoethanol and 0.1 g of sodium bisulfite in 50 g of water was added dropwise over the course of 2 hours, and another feed consisting of 1 g of tert-butyl hydroperoxide in 50 g of water was added dropwise over the course of 4 hours. After the addition of the peroxide was complete, the reaction mixture was stirred at 50° C. for a further 2 hours. The result was a clear viscous liquid with a solids content of 20.7% and a K value of 21.9.

EXAMPLE 9

100 g of water and 30 g of 4-methyl-1-vinylimidazole were introduced into a flask which had a capacity of 250 ml and was equipped with a stirrer and a device for operating under nitrogen, and were heated to 80° C. under a nitrogen atmosphere. As soon as this temperature was reached, a feed consisting of 0.6 g of 2,2'-azobis(2-amidinopropane) dihydrochloride and 0.15 g of mercaptoethanol in 50 g of water was added dropwise over the course of 6 hours. After the addition of the polymerization initiator was complete, the reaction mixture was stirred at 80° C. for a further 2 hours. The result was a clear viscous liquid with a solids content of 19.5% and a K value of 30.5.

EXAMPLE 10

100 g of water were introduced into a flask which had a capacity of 1000 ml and was equipped with a stirrer and a device for operating under nitrogen, and were heated to 85° C. under a nitrogen atmosphere. As soon as this temperature was reached, a feed consisting of 10 g of 2-ethyl-1-vinylimidazole and 30 mg of mercaptoethanol was added dropwise over the course of 2 hours, and another feed consisting of 0.1 g of 2,2'-azobis(2-amidinopropane) dihydrochloride in 30 g of water was added dropwise over the course of 4 hours. After the addition of the polymerization initiator was complete, the reaction mixture was stirred at 85° C. for a further 2 hours. The result was a clear viscous liquid with a solids content of 7.1% and a K value of 20.4.

EXAMPLE 11

100 g of water were introduced into a flask which had a capacity of 1000 ml and was equipped with a stirrer and a device for operating under nitrogen, and were heated to 80° C. under a nitrogen atmosphere. As soon as this temperature was reached, a feed consisting of 30 g of 2-ethyl-4-methyl-1-vinylimidazole and 0.2 g of mercaptoethanol in 30 g of water was added dropwise over the course of 2 hours, and another feed consisting of 0.3 g of 2,2'-azobis(2- amidinopropane) dihydrochloride in 50 g of water was added dropwise over the course of 4 hours. After the addition of the polymerization initiator was complete, the reaction mixture was stirred at 80° C. for a further 2 hours. The result was a clear viscous liquid with a solids content of 14.3% and a K value of 22.0.

APPLICATION TESTS

The effect of a polymer prepared according to the invention on the stability of liquid detergents was tested using the following liquid detergent composition:

30 parts of the adduct of 7 mol of ethylene oxide and 1 mol of $C_{13}/C_{15}$ oxo alcohol 8 parts of dodecylbenzenesulfonic acid 15 parts of coconut fatty acid 5 parts of monoethanolamine 3 parts of polypropylene glycol with a molecular weight of 600

7 parts of 1,2-propylene glycol 15 parts of a modified polycarboxylate (product of the reaction of maleic anhydride/isobutene copolymer with 8-fold ethoxylated $C_{12}/C_{14}$ oxo alcohol disclosed in EP-A-0 367 049)

1 part of the polymer acting as dye transfer inhibitor 16 parts of water.

The prior art polymers acting as dye transfer inhibitors tested in the liquid detergent formulation described above were the following products:

Inhibitor 1: polyvinylpyrrolidone with K value 30

Inhibitor 2: polyvinylpyrrolidone with K value 17

Inhibitor 3: polyvinylimidazole with K value 30

The dye transfer inhibitor used according to the invention was the poly(2-methyl-1-vinylimidazole) prepared in Example 2.

Whereas unstable mixtures which separated immediately were obtained on use of each of inhibitors 1, 2 and 3 in the liquid detergent formulation indicated above, the result on use of the polymer prepared in Example 2 was a storage-stable liquid detergent which showed no detectable phase separation even after storage at 40° C. for 3 months.

The tests described above were repeated with a commercial color detergent which contained no color transfer inhibitor. 1% by weight of each of inhibitors 1, 2 and 3 described above, and of each of the polymers prepared in Examples 2 and 4 was added to this liquid detergent (Persil® color liquid). The liquid detergent formulations which contained inhibitors 1,2 or 3 were unstable after storage for only one day, whereas liquid detergent formulations which contained 1% by weight of the polymer prepared in Example 2 or Example 4 were still stable and showed no separation at all even after storage at 40° C. for 3 months.

The effectiveness of polymers prepared according to the invention in respect of inhibiting transfer of dyes was determined by washing tests in which the dye was added to the liquor in dissolved form. The dye used was Basilens® brown E-4-R (C.I. Reactive brown 32), and the detergent used was Persil color liquid, to which 1%, based on the amount of detergent, of one of the polymers indicated in Table 2 was added in each case. The washing conditions are indicated in Table 1, while Table 2 summarizes the results of the inhibition of transfer of dye.

TABLE 1

| Machine | Launder-o-meter |
|---|---|
| Cycles | 1 |
| Temperature | 60° C. |
| Duration | 30 min |
| Water hardness | 3 mmol $Ca^{2+}$, $Mg^{2+}$(4:1)/l |
| Test fabric | 10 g cotton, 5 g polyester/cotton 5 g polyester |
| Liquor ratio | 1:12.5 |
| Amount of liquor | 250 ml |
| Concentration | 7 g/l |
| Dye concentration | 0.001% Basilen brown E-4-R |

TABLE 2

Inhibition of transfer of dye

| | Reflectance (%) | | |
|---|---|---|---|
| | Cotton | Polyester/cotton | Polyester |
| Persil color liquid | 58.3 | 58.1 | 80.4 |
| Persil color liquid + 1% polymer of Ex. 2 | 77.6 | 77.0 | 80.4 |
| Persil color liquid + 1% polymer of Ex. 4 | 76.2 | 76.6 | 80.4 |

As is evident from Table 2, addition of 1% of one of the polymers to be used according to the invention very markedly impedes transfer of dye to cotton and polyester/cotton.

We claim:

1. A polymer of alkyl-1-vinylimidazoles, which is obtain by free-radical polymerization of a monomer mixture comprising:
   (a) 10–100% by weight of at least one alkyl-vinylimidazole,
   (b) 0–90% by weight of 1-vinylpyrrolidone, 1-vinylcaprolactam, 1-vinyltriazole, 1-vinylimidazole, 1-vinyloxazolidinone or a mixture thereof; and
   (c) 0–30% by weight of other monoethylenically unsaturated monomers, in water, at least one $C_{1-4}$ alcohol or a mixture thereof, in the presence of a polymerization regulator,
   wherein said polymer is soluble in water, at least one $C_{1-4}$ alcohol or a mixture thereof.

2. The polymer of claim 1, wherein said alkyl-vinylimidazole is of the formula

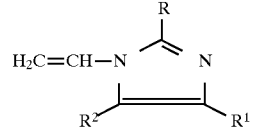

where R, $R^1$, $R^2$ are each independently H and $C_{1-4}$ alkyl.

3. The polymer of claim 1, wherein said alkyl-vinylimidazole is selected from the group consisting of 2-methyl-1-vinylimidazole, 2-ethyl-1-vinylimidazole, 2-propyl-1-vinylimidazole, 2-butyl-1-vinylimidazole, 2,4-dimethyl-1-vinylimidazole, 2,5-dimethyl-1-vinylimidazole, 2-ethyl-4-methyl-1-vinylimidazole, 2-ethyl-5-methyl-1-vinylimidazole, 2,4,5-trimethyl-1-vinylimidazole, 4,5-diethyl-2-methyl-1-vinylimidazole, 4-methyl-1-vinylimidazole, 4-ethyl-1-vinylimidazole, 4,5-dimethyl-1-vinylimidazole, 5-methyl-1-vinylimidazole, 2,4,5-triethyl-1-vinylimidazole and a mixture thereof.

4. The polymer of claim 1, wherein said polymer has a K value of 10–60 as determined by the method of H.

Fikentscher in 0.1% strength aqueous solution at 25° C. with a polymer concentration of 1% by weight.

5. A composition which comprises the polymer of claim 1 and a detergent.

6. A process for preparing polymers of alkyl-1-vinylimidazoles by free-radical polymerization of a monomer mixture, comprising:

(a) 10–100% by weight of at least one alkyl-vinylimidazole, (b) 0–90% by weight of 1-vinylpyrrolidone, 1-vinylcaprolactam, 1-vinyltriazole, 1-vinylimidazole, 1-vinyloxazolidinone or a mixture thereof; and (c) 0–30% by weight of other monoethylenically unsaturated monomers, in water, at least one $C_{1-4}$ alcohol or a mixture thereof, in the presence of a polymerization regulator, wherein said polymer is soluble in water, at least one $C_{1-4}$ alcohol or a mixture thereof, and said polymerization is conducted in the presence of a polymerization initiator.

7. A process as claimed in claim 6, wherein the polymerization regulators contain sulfur in bound form.

8. A process as claimed in claim 6, wherein the polymerization regulators are employed in amounts of from 0.1 to 15% by weight, based on the monomers.

9. A process as claimed in claim 6, wherein mercapto compounds, dialkyl sulfides, dialkyl disulfides and/or diaryl sulfides are employed as polymerization regulators.

10. A process as claimed in claim 6, wherein the polymerization regulators are added continuously or in portions during the polymerization of the monomers.

* * * * *